(12) United States Patent
Otashiro et al.

(10) Patent No.: US 9,034,993 B2
(45) Date of Patent: May 19, 2015

(54) ROOM TEMPERATURE-CURABLE POLYORGANOSILOXANE COMPOSITION

(71) Applicant: MOMENTIVE PERFORMANCE MATERIALS JAPAN LLC, Tokyo (JP)

(72) Inventors: Koki Otashiro, Tokyo (JP); Isao Iida, Tokyo (JP)

(73) Assignee: MOMENTIVE PERFORMANCE MATERIALS JAPAN LLC, Tokyo (JP)

( * ) Notice: Subject to any disclaimer, the term of this patent is extended or adjusted under 35 U.S.C. 154(b) by 0 days.

(21) Appl. No.: 13/928,820

(22) Filed: Jun. 27, 2013

(65) Prior Publication Data

US 2013/0303676 A1 Nov. 14, 2013

Related U.S. Application Data

(63) Continuation of application No. PCT/JP2012/003071, filed on May 10, 2012.

(30) Foreign Application Priority Data

May 13, 2011 (JP) ................. 2011-108407

(51) Int. Cl.
*C08K 3/36* (2006.01)
*C09J 183/04* (2006.01)
*C08G 77/16* (2006.01)
*C08K 5/544* (2006.01)
*C08G 77/18* (2006.01)
*C08K 9/06* (2006.01)

(52) U.S. Cl.
CPC . *C08K 3/36* (2013.01); *C08G 77/16* (2013.01); *C08K 5/544* (2013.01); *C08G 77/18* (2013.01); *C08K 9/06* (2013.01); *C09J 183/04* (2013.01)

(58) Field of Classification Search
USPC ........................................................ 525/477
See application file for complete search history.

(56) References Cited

U.S. PATENT DOCUMENTS

| | | | |
|---|---|---|---|
| 8,304,085 B2 * | 11/2012 | Barnard et al. ............... | 428/447 |
| 2006/0089431 A1 * | 4/2006 | Kawakami et al. ............ | 524/59 |
| 2011/0046320 A1 * | 2/2011 | Katayama et al. ............ | 525/477 |

FOREIGN PATENT DOCUMENTS

| | | |
|---|---|---|
| EP | 0 572 927 A1 | 12/1993 |
| EP | 1 174 462 A1 | 1/2002 |
| EP | 2 130 873 A1 | 12/2009 |
| EP | 2 223 968 A1 | 9/2010 |
| JP | 05-331370 A | 12/1993 |
| JP | 07-133430 A | 5/1995 |
| JP | 11-209620 A | 8/1999 |
| JP | 2006-265529 A | 10/2006 |
| JP | 2008-150491 A | 7/2008 |
| JP | 2009-292914 A | 12/2009 |
| JP | 2010-084062 A | 4/2010 |
| JP | 2010-084063 A | 4/2010 |
| JP | 2010-120984 A | 6/2010 |
| WO | WO 2007123926 A2 * | 11/2007 |

* cited by examiner

*Primary Examiner* — Mike M Dollinger
(74) *Attorney, Agent, or Firm* — Foley & Lardner LLP

(57) ABSTRACT

A room temperature-curable polyorganosiloxane composition is a two component-type room temperature-curable polyorganosiloxane composition including (A) a base composition and (B) a cross-linking agent composition. The component (A) contains (a1) polyorganosiloxane having a hydroxyl group or an alkoxy group at a molecular end and (a2) an inorganic filler. The component (B) includes (b1) an organosilicon compound having three or more hydrolyzable groups in one molecule, (b2) polyorganosiloxane having an alkoxy group at a molecular end and represented by the following general formula and, and (b3) a curing catalyst.

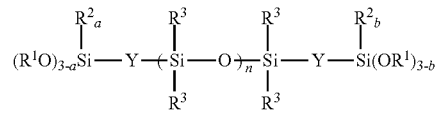

In the two component-type room temperature-curable polyorganosiloxane composition, it is possible to appropriately adjust a compounding ratio of the base component and the cross-linking component according to the use of an automatic mixer/discharger or the like without deteriorating properties such as deep-part curability, curing uniformity, and storage stability.

6 Claims, No Drawings

ROOM TEMPERATURE-CURABLE POLYORGANOSILOXANE COMPOSITION

CROSS-REFERENCE TO RELATED APPLICATIONS

This application is a continuation of prior International Application No. PCT/JP2012/003071 filed on May 10, 2012, which is based upon and claims the benefit of priority from Japanese Patent Application No. 2011-108407 filed on May 13, 2011; the entire contents of all of which are incorporated herein by reference.

FIELD

The present invention relates to a room temperature-curable polyorganosiloxane composition, and more particularly to a polyorganosiloxane composition which is composed of two components, that is, a base composition and a cross-linking agent composition and which cures at room temperature when the both are mixed in the air to produce a rubbery elastic body.

BACKGROUND

Polyorganosiloxanes (silicones) of a condensation reaction type that cure at room temperature to produce rubbery elastic bodies are in wide use as an elastic adhesive, a coating material, an electrically insulating sealing material, and the like in the electric and electronic industry and also as a building sealing material.

Among them, polyorganosiloxane of a single-component type (single-package type) which undergoes a curing reaction when coming into contact with water in the air is easy to handle because there is no need for a troublesome work of weighing and mixing a base polymer and a cross-linking agent, a catalyst, and so on immediately before it is used, but it has disadvantages of a slow curing speed and poor deep-part curability.

On the other hand, room temperature-curable polyorganosiloxane of a two-component type is high in curing speed and excellent in deep-part curability. In preparing this composition, a base component composed of: polydiorganosiloxane having molecular ends capped with hydroxyl groups and/or alkoxy groups; and an inorganic filler is separately prepared from a cross-linking component. They are preserved in separate containers and mixed when in use, that is, this composition is used as what is called a multi-package-type room temperature-curable composition (refer to JP-A Hei 7-133430 (KOKAI), JP-A Hei 11-209620 (KOKAI), for example).

However, in such room temperature-curable polyorganosiloxane of the two-component type, since the cross-linking component is composed only of a cross-linking agent and a curing catalyst in view of storage stability, a compounding ratio of the cross-linking component to the base component is very small such as 1 to 3 mass %, which is likely to cause wide variation in quantity at the time of measurement and poor mixing.

Especially in the mixing using an automatic mixer/discharger, in a practical point of view, a mixing ratio of the base component and the cross-linking component is required to be about 100:10, or an integer ratio where the ratio of the cross-linking component is equal to or more than the aforesaid ratio, but for a conventional silicone rubber of the two-component type whose cross-linking component is composed only of the cross-linking agent and the curing catalyst, the measurement without any variation has been difficult.

In the case where the automatic mixer/discharger is used for the measurement and mixture, in order to increase a mixing ratio of the cross-linking component, it is conceivable that the same polymer as a base polymer (for example, silanol group-terminated polydiorganosiloxane) in the base component is blended as an extender also in the cross-linking component. However, such a two-component-type composition has problems of not only deterioration of storage stability of the cross-linking component due to the coexistence of the base polymer, the cross-linking agent, and the catalyst in the cross-linking component but also the separation of the base polymer and the cross-linking agent due to their poor compatibility.

SUMMARY OF THE INVENTION

The present invention was made to solve these problems, and its object is to make it possible, in a room temperature-curable polyorganosiloxane composition of a two-component type, to adjust a blending ratio of a base component and a cross-linking component according to the use of an automatic mixer/discharger or the like, without deteriorating properties such as deep-part curability, curing uniformity, and storage stability.

A room temperature-curable polyorganosiloxane composition of the present invention includes: (A) a base composition including: (a1) polyorganosiloxane having a hydroxyl group or an alkoxy group at a molecular end; and (a2) an inorganic filler; and (B) a cross-linking agent composition including: (b1) an organosilicon compound having, in one molecule, three hydrolyzable groups or more combined with silicon atoms, or a partial hydrolysate of the organosilicon compound; (b2) polyorganosiloxane having an alkoxy group at a molecular end and represented by a general formula:

[Chemical Formula 1]

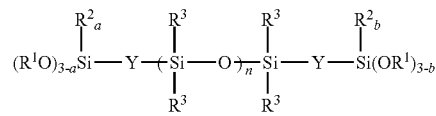

(where $R^1$'s represent alkyl groups or alkoxyalkyl groups that may be identical or different, and $R^2$'s and $R^3$'s both represent unsubstituted or halogen- or cyano group-substituted univalent hydrocarbon groups that may be identical or different, Y represents an oxygen atom or an unsubstituted bivalent hydrocarbon group, a is 0 or 1, b is 0 or 1, and n is an integer of 1 to 30); and (b3) a curing catalyst.

In the room-temperature curable polyorganosiloxane composition of the present invention, the component (a1) is preferably polyorganosiloxane having the hydroxyl group at the molecular end. The curing catalyst (b3) can be an organic compound containing a nitrogen atom. Further, the curing catalyst (b3) can be an amino group-containing alkoxysilane represented by a general formula: $(R^4O)_3Si\text{---}R^5\text{---}NH\text{---}R^6$ (where $R^4$'s represent alkyl groups or alkoxyalkyl groups that may be identical or different, $R^5$ represents an unsubstituted bivalent hydrocarbon group, and $R^6$ represents a hydrogen atom, or an unsubstituted or halogen- or cyano group-substituted univalent hydrocarbon group, or an aminoalkyl group).

Further, the base composition (A) can contain the inorganic filler (a2) at a ratio of 1 to 500 parts by mass to 100 parts by mass of the component (a1), and the cross-linking agent composition (B) can be compounded so that, to 100 parts by mass of the component (a1), the component (b2) is 0.5 to 20 parts by mass and the curing catalyst (b3) is 0.01 to 10 parts by mass, and the number of the alkoxy groups of the component (b1) per one piece of the hydroxyl group or the alkoxy group of the component (a1) is 2 to 20. Furthermore, the base composition (A) and the cross-linking agent composition (B) can be compounded at a mass ratio of 100:3 to 100:20.

According to the room-temperature curable organosiloxane composition of the two-component type of the present invention, it is possible to obtain a composition in which a blending ratio of the base composition and the cross-linking agent composition can be adjusted according to the use of an automatic mixer/discharger or the like and which is excellent in various properties such as deep-part curability, curing uniformity, and storage stability.

DETAILED DESCRIPTION

An embodiment of the room-temperature curable polyorganosiloxane composition of the present invention will be hereinafter described.

The embodiment of the present invention is a room-temperature curable polyorganosiloxane composition of a two-component type comprising (A) a base composition and (B) a cross-linking agent composition. The base composition (A) contains (a1) polyorganosiloxane having a hydroxyl group or an alkoxy group at a molecular end and (a2) an inorganic filler. The cross-linking agent composition (B) contains (b1) an organo silicon compound having, in one molecule, three hydrolyzable groups or more as silicon functional groups, or a partial hydrolysate thereof, (b2) polyorganosiloxane represented by a specific formula and having an alkoxy group at a molecular end, and (b3) a curing catalyst. Hereinafter, the components included in the base composition (A) and the cross-linking agent composition (B) will be described.

<(A) Base Composition>
(a1) Component

Polyorganosiloxane being the component (a1) having the hydroxyl group or the alkoxy group at the molecular end is used as a base polymer of condensation-type silicone rubber that is curable at room temperature, and is preferably polydiorganosiloxane having a linear-chain structure. In view of a reaction speed, the use of polyorganosiloxane having the hydroxyl group at the molecular end is more preferable.

In the component (a1), examples of an organic group directly combined with a silicon atom other than the hydroxyl group and the alkoxy group are: an alkyl group such as a methyl group, an ethyl group, a propyl group, a butyl group, and a hexyl group; an alkenyl group such as a vinyl group and an allyl group; an aryl group such as a phenyl group; an aralkyl group such as a 2-phenyl ethyl group, and a 2-phenyl propyl group; an alkyl group substituted by halogen or a cyano group, such as a chloromethyl group, a β-cyanoethyl group, and a 3,3,3-trifluoropropyl group; and the like. The methyl group, the vinyl group, or the phenyl group is preferable because their synthesis is easy.

Among these organic groups, the methyl group can most easily produce a raw material intermediate and imparts the lowest viscosity considering the degree of polymerization of siloxane. Further, it provides polyorganosiloxane having a good balance between extrusion workability of the composition before the curing and a physical property of a rubbery elastic body after the curing. Therefore, the methyl group is preferably 85% or more of all the organic groups, and more preferably, all the organic groups except the hydroxyl group and the alkoxy group are methyl groups. As part of the organic groups, the phenyl group is desirably contained when the rubbery elastic body after the curing needs to be cold resistant and heat resistant, and the 3,3,3-trifluoropropyl group is desirably contained when the rubbery elastic body after the curing especially needs to be oil resistant.

The hydroxyl group or the alkoxy group at the molecular end in the component (a1) contributes to the curing when it reacts with the hydrolyzable groups or the like of the component (b1) which will be later described. Examples of the alkoxy group are a methoxy group, an ethoxy group, an isopropoxy group, and the like. In view of reactivity, the hydroxyl group or the methoxy group is preferably contained as an end group, and the hydroxyl group is especially preferably contained.

A viscosity of the component (a1) at 23° C. is preferably within a range of 0.1 to 1000 Pa·s. When the viscosity is less than 0.1 Pa·s, a mechanical property of the rubbery elastic body after the curing is not sufficient, and when it is over 1000 Pa·s, it is difficult to obtain a uniform composition when the later-described inorganic filler is mixed and moldability deteriorates. A more preferable viscosity is 0.3 to 100 Pa·s, and an especially preferable viscosity is 0.3 to 50 Pa·s.

(a2) Inorganic Filler

The inorganic filler being the component (a2) is blended in the base composition (A) for the purpose of imparting mechanical strength and hardness to the rubbery elastic body after the curing. A known inorganic filler can be used, and examples thereof are silica powder, fine mica powder, diatomaceous earth, calcium carbonate, zinc carbonate, iron oxide, titanium oxide, zinc oxide, pulverized quartz, carbon black, and the like. One kind may be used solely or a mixture of two kinds or more may be used. In particular, the use of the silica powder such as aerosol silica (fumed silica), precipitated silica (wet silica), silica aerogel, pulverized quartz, and molten silica is desirable. Further, silica powder surface-treated by an organosilicon compound such as polydimethylsiloxane, octamethylcyclotetrasiloxane, or hexamethyldisilazane may be used.

A compounding amount of the inorganic filler (a2) per 100 parts by mass of the component (a1) is 1 to 500 parts by mass, more preferably 3 to 200 parts by mass, and especially preferably 3 to 150 parts by mass. When the compounding amount of the inorganic filler (a2) is less than 1 part by mass, mechanical strength of an obtained cured product is insufficient, and when the compounding amount is over 500 parts by mass, the mixing becomes difficult and a uniform composition cannot be obtained.

<(B) Cross-Linking Agent Composition>
(b1) Organosilicon Compound Having Hydrolyzable Groups or Partial Hydrolysate Thereof The organosilicon compound having three hydrolyzable groups or more in one molecule or its partial hydrolysate, being the component (b1), acts as a cross-linking agent of the aforesaid component (a1), and it is hydrolyzed by water in the air and easily undergoes a condensation reaction with the hydroxyl group (silanol group) or the alkoxy group of the component (a1), so that the cured product is produced.

Examples of the hydrolyzable group that the component (b1) has are an alkoxy group such as a methoxy group, an ethoxy group, a propoxy group, an isopropoxy group, and a butoxy group; an alkoxyalkoxy group such as a methoxyethoxy group; and the like. An example of a group combined with a silicon atom except the hydrolyzable groups is a substituted or unsubstituted univalent hydrocarbon group similar to the organic group directly combined with the silicon atom in the aforesaid component (a1). In view of easiness of synthesis and a cross-linking speed, an alkyl group whose carbon number is 1 to 8, an alkenyl group and a phenyl group whose carbon numbers are 2 to 5 are preferable.

Concrete examples of such a component (b1) are alkoxysilane such as tetraethoxysilane, tetramethoxysilane, methyltrimethoxysilane, vinyltrimethoxysilane, methyltriethoxysilane, vinyltriethoxysilane, ethylorthosilicate, and propyl orthosilicate, partial hydrolysates of these, and the like. A partial hydrolysate of tetraethoxysilane or tetramethoxysilane is preferable, and a hydrolyzed condensate whose degree of polymerization is 3 to 15 is more preferable. When the degree of polymerization is less than 3, deep-part curability is liable to be insufficient, and when the degree of polymerization is over 15, workability is liable to deteriorate.

A compounding amount of the component (b1) is adjusted so that the number of its hydrolyzable groups is 2 to 20 per one piece of the hydroxyl group or the alkoxy group in the component (a1). When the compounding amount of the component (b1) is less than this range, cross linking does not sufficiently take place and a cured product having sufficient hardness cannot be obtained, and in addition, storage stability of the cross-linking agent composition deteriorates. On the other hand, compounding it over this range not only is economically meaningless but also is liable to greatly deteriorate the balance between curability of the composition and the mechanical property after the curing. The number of the hydrolyzable groups of the component (b1) is more preferably 2 to 15 per one piece of the hydroxyl group or the alkoxy group in the component (a1).

(b2) Polyorganosiloxane Having Alkoxy Group

In the present invention, the component (b2) included in the cross-linking agent composition (B) together with the aforesaid component (b1) is a component that serves to dilute the component (b1) in the cross-linking agent composition (B) and to adjust a compounding ratio of the base composition (A) and the cross-linking agent composition (B) to a mixture ratio suitable for measuring/mixing by an automatic mixer/discharger or the like.

As the component (b2), used is polyorganosiloxane having an alkoxy group at a molecular end and represented by a general formula:

[Chemical Formula 2]

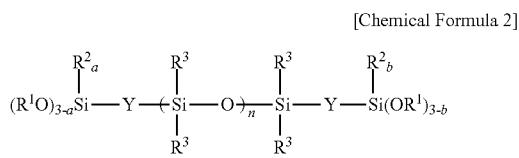

In the formula, $R^1$'s represent alkyl groups or alkoxyalxyl groups that may be identical or different. Examples thereof are an alkyl group such as a methyl group, an ethyl group, a propyl group, an isopropyl group, a butyl group, and a hexyl group; and an alkoxyalkyl group such as a methoxyethyl group, among which the methyl group and the ethyl group are preferable, and the methyl group is especially preferable.

$R^2$'s and $R^3$'s both represent unsubstituted or halogen- or cyano group-substituted univalent hydrocarbon groups that may be identical or different. Examples of $R^2$ and $R^3$ are the same groups as the organic groups directly combined with the silicon atom in the aforesaid component (a1), among which an alkyl group is preferable, and a methyl group is especially preferable. Y represents an oxygen atom (oxo group) or a bivalent hydrocarbon group. Examples of the bivalent hydrocarbon group are an alkylene group such as a methylene group, an ethylene group, a propylene group, a tetramethylene group, a hexamethylene group, and a methylethylene group, and the oxygen atom (oxo group) or the propylene group is preferable, a is 0 or 1 and b is 0 or 1. In view of easiness of synthesis, a and b are preferably equal.

Further, in the general formula expressing the component (b2), n is an integer of 1 to 30. When a value of n is over 30, the cross-linking agent composition (B) separates and a uniform cured product cannot be obtained due to poor solubility to the component (b1) and the component (b3). The value of n is more preferably within a range of 1 to 20 and more preferably within a range of 3 to 15.

A compounding amount of the component (b2) changes depending on easiness of handling and a structure of the composition, but is preferably 0.5 to 20 parts by mass per 100 parts by mass of the aforesaid component (a1). When this compounding amount is less than 0.5 parts by mass, its compounding has no effect, and on the other hand, when the compounding amount is over 20 parts by mass, rubber strength of the cured product sometimes lowers.

(b3) Curing Catalyst

The component (b3) is a curing catalyst to cause the hydroxyl group or the alkoxy group of the component (a1) and the hydrolyzable groups of the component (b1) to react with each other under the presence of water. Examples of the curing catalyst are: carboxylate metal salt such as iron octoate, manganese octoate, zinc octoate, tin naphtate, tin caprylate, and tin aleate; an organotin compound such as dibutyltin diacetate, dibutyltin dioctoate, dibutyltin dilaurate, dibutyltin diolate, diphenyltin diacetate, dibutyltin oxide, dibutyltin dimethoxide, dibutylbis(triethoxysiloxy)tin, and dioctyltin dilaurate; alkoxytitaniums such as tetraethoxytitanium, tetrapropoxytitanium, tetrabutoxytitanium, and 1,3-propoxy titanium bis(ethylacetylacetate); an organoaluminum compound such as aluminum tris(acetylacetonato), aluminum tris(ethylacetoacetate), diisopropoxy aluminum ethylacetoacetate, and triethoxyaluminum; an organozirconium compound such as zirconium tetra(acetylacetonato), tetraisopropoxyzirconium, tetrabutoxyzirconium, tributoxyzirconium acetylacetonate, and tributoxyzirconium stearate; and the like. The use of the organotin compound and the alkoxy titaniums is preferable since their presence in even a minute amount produces high catalytic performance. The organotin compound is more preferable because it is excellent in deep-part curability.

Further, in recent years, the development of an environment-conscious product in which an organotin compound is not compounded has been expected, and from such a point of view, the use of an organic compound having a nitrogen atom as the curing catalyst (b3) is preferable.

As the organic compound having the nitrogen atom, usable are, for example, diethylhydroxylamine, dimethylhydroxylamine, guanidine derivatives such as 1,1,3,3-tetramethylguanidine, 1,3-diphenylguanidine, 1,2,3-triphenylguanidine, and 1,1,3,3-tetramethyl-2-[3-(trimethylsilyl)propyl] guanidine, and amino group-containing alkoxysilane (also called amino group-substituted alkoxysilane) represented by a general formula: $(R^4O)_3Si—R^5—NH—R^6$.

In the above formula expressing the amino group-containing alkoxysilane, $R^4$'s are alkyl groups or alkoxyalkyl groups that may be identical or different. Examples of $R^4$, similarly to $R^1$ in the aforesaid component (b2), are: an alkyl group such as a methyl group, an ethyl group, a propyl group, an isopropyl group, a butyl group, and a hexyl group; an alkoxyalkyl group such as a methoxyethyl group; and the like, among which the methyl group and the ethyl group are preferable, and the methyl group is especially preferable. $R^5$ is a bivalent hydrocarbon group. Examples thereof are alkylene groups such as a methylene group, an ethylene group, a propylene group, a tetramethylene group, a hexamethylene group, and a methylethylene group, among which the propylene group is preferable. $R^6$ is a hydrogen atom, or an unsubstituted or halogen- or cyano group-substituted univalent hydrocarbon group, or is an aminoalkyl group. Examples of the unsubstituted univalent hydrocarbon group are an alkyl group such as a methyl group, an ethyl group, a propyl group, and a butyl group; an arylene group such as a phenylene group and a tolylene group; an alkylenearylene group such as a methylenephenylene group and an ethylenephenylene group; and the like. Examples of the aminoalkyl group are an aminoethyl group, an N-aminoethylaminoethyl group, and the like. Concrete examples of the amino group-containing alkoxysilane represented by the aforesaid general formula are: aminomethyl triethoxysilane, γ-aminopropyl triethoxysilane, γ-aminopropyl trimethoxysilane, N-(β-aminoethyl) aminomethyl tributoxysilane, N-(β-aminoethyl)-γ-aminopropyl triethoxysilane, N-(β-aminoethyl)-γ-aminopropyl trimethoxysilane, γ-anilinopropyl triethoxysilane, and the like.

Preferable ones as the organic compound having the nitrogen atom are γ-aminopropyl triethoxysilane, N-(β-aminoethyl)-γ-aminopropyl triethoxysilane, and 1,1,3,3-tetramethyl-2-[3-(trimethylsilyl)propyl]guanidine.

As the curing catalyst (b3) including such an organic compound having the nitrogen atom, one kind can be used solely or the mixture of two or more kinds can be used. Incidentally, the organic compound having the nitrogen atom not only acts as the curing catalyst to promote the reaction between the hydroxyl group or the alkoxy group of the component (a1) and the hydrolyzable groups of the component (b1) but also has a function as an adhesion imparting agent. Therefore, when the organic compound having the nitrogen atom is used as the curing catalyst, a cured product excellent in adhesiveness is obtained.

The total compounding amount of the component (b3) is 0.01 to 10 parts by mass, preferably 0.05 to 5 parts by mass, and especially preferably 0.05 to 3 parts by mass per 100 parts by mass of the component (a1). When it is less than 0.01 parts by mass, not only the curing takes a long time but also the curing especially in a deep part of a rubber layer distant from a contact surface with the air becomes insufficient. When the component (b3) is over 10 parts by mass, an effect worth the compounding amount is not obtained, which is not only meaningless but also economically disadvantageous. In view of adhesiveness improvement, the compounding amount of the amino group-containing alkoxysilane in the component (b3) is more preferably 0.1 to 5 parts by mass per 100 parts by mass of the component (a1). When this compounding amount is over 5 parts by mass, rubber strength of the cured product is liable to lower. In imparting adhesiveness as well, the co-use of the organotin compound or the like is desirable in view of stable curability.

In preparing the room temperature-curable polyorganosiloxane composition of the present invention, the base composition (A) including the component (a1) and the organic filler (a2) and the cross-linking agent composition (B) including the component (b1) being the cross-linking agent, the component (b2), and the curing catalyst (b3) are separately prepared, and they are separately stored in a moisture-tight state. Then, when in use, the base composition (A) and the cross-linking agent composition (B) are mixed at an appropriate compounding ratio, and when the resultant is exposed to water in the air, it undergoes the condensation reaction to cure, so that the cured product having rubbery elasticity is obtained.

In the room temperature-curable polyorganosiloxane composition of the present invention, the compounding ratio (mass ratio) of the base composition (A) and the cross-linking agent composition (B) is preferably 100:3 to 100:20. Further, in view of easiness of measurement and mixing and easy handlability, the base composition (A) and the cross-linking agent composition (B) are preferably compounded at an integer ratio. When the compounding ratio falls out of the above range and the mass ratio of the cross-linking agent composition (B) is too low, the curing becomes insufficient, and the cured product cannot be obtained. When the mass ratio of the cross-linking agent composition (B) is too high, the composition cures during stirring and mixing, and a cured product having good properties cannot be obtained. A more preferable compounding ratio of the base composition (A) and the cross-linking agent composition (B) is 100:5 to 100:15.

<Other Additives>

Various kinds of additives such as a pigment, a thixotropy imparting agent, a viscosity improver for improving extrusion workability, an ultraviolet absorbent, an anti-mildew agent, a heat resistance improver, and a flame retardant may further be added to the composition of the present invention according to a purpose. These additives are ordinarily added and mixed in the base composition (A).

According to the room temperature-curable polyorganosiloxane composition of the present invention, it is possible to adjust the compounding ratio of the base composition (A) and the cross-linking agent composition (B) according to the use of an automatic mixer/discharger or the like, and in addition, it is possible to obtain a composition excellent in various properties such as deep-part curability, curing uniformity, and storage stability.

EXAMPLES

Hereinafter, examples of the present invention will be further concretely described, but the present invention is not limited to the examples. Note that, in the examples, "parts" all represent "parts by mass", and physical property values such as viscosity are all values at 23° C. and a 50% relative humidity.

Example 1

5-part silica powder (ROX200; trade name of Nippon Aerosil Co., Ltd.) (a2) surface-treated by silazane was added to 95-part linear polydimethylsiloxane (α,ω-bis-dihydroxy polydimethylsiloxane) (a1) having a 3 Pa·s viscosity (number average polymerization degree 320) and having hydroxyl groups at both ends (hydroxyl group content 0.05 mmol/g), and after uniformly mixed by a planetary mixer, they were subjected to heated vacuum kneading at 10° C. and 200 mmHg for two hours, so that a uniform base composition (A) was obtained.

A 2-part tetraethoxysilane partially hydrolyzed condensate (degree of polymerization 7, alkoxy group content 19.2 mmol/g) (b1-1), 0.05-part dibutyltin dilaurate (b3-1), and 1-part N-(β-aminoethyl)-γ-aminopropyl trimethoxysilane (b3-3) were added to 6-part polydimethylsiloxane (b2-1) whose both ends were capped with methyldimethoxy groups and whose degree of polymerization was 7, and they were mixed, so that a cross-linking agent composition (B) was prepared.

Next, an initial state (I) of the obtained cross-linking agent composition (B) was examined in the following manner.

(I) Initial State of Component (B)

A mixture state of the obtained cross-linking agent composition (B) was observed. One in which the components were uniformly mixed was evaluated as "uniform", one in which the separation of the components or cloudiness was seen was evaluated as "non-uniform", and one in which an increase of viscosity was seen and fluidity was lost was evaluated as "gelated". Incidentally, one in which "gelation" was seen in the initial state of the preparation of the component (B) was not subjected to the evaluation thereafter.

Further, the base composition (A) and the cross-linking agent composition (B) obtained in the above were compounded at the mass ratio (100:9) shown in Table 1 and mixed until they became uniform, and the resultant was subjected to vacuum degassing, and thereafter, it was filled in a polystyrene cup having a 25 ml capacity. Then, it was left in a 23° C., 50% RH atmosphere for 24 hours to be cured, and thereafter, a curing state of the inside of an obtained cured product was observed and deep-part curability (II) was examined.

Hardness variation (III) and a surface state (IV) of the cured product were examined in the following manner. Further, in order to find storage stability of the cross-linking agent composition (B), the cross-linking agent composition (B) put in a glass bottle was aged in a 70° C. oven for five days. Then, (V) a state (uniformity of the composition) of the component (B) after the aging and (VI) curability of the component (B) after the aging were examined. At this time, similarly to the above, it was filled in a polystyrene cup having a 25 ml capacity and was left in a 23° C., 50% RH atmosphere for 24 hours to be cured, and thereafter a curing state of the inside of the obtained cured product was observed.

(III) Hardness Variation of Cured Product

The cross-linking agent composition (B) was measured in a disposable cup having a 500 ml capacity so that its compounding ratio to 200 g of the base composition (A) became as shown in Table 1, and they were vigorously stirred for one minute with a glass rod having a 5 mm diameter. Thereafter, the resultant having undergone vacuum degassing was poured into five 30×80×6 mm metal molds coated with Teflon (registered trademark), and they were left at 23° C. and 50% RH for 24 hours to be cured. Hardness of each of obtained five cured products was measured by a hardness meter (type E), and a difference between the maximum value and the minimum value of the hardness was found.

(IV) Surface State of Cured Product

Surface states of the cured products fabricated in the measurement of the above (III) were observed and the presence/absence of oil bleed was examined. Then, one without any oil bleed was evaluated as "good", and one having oil bleed was evaluated as "defective".

(V) State of Component (B) after Aging 30 g of the cross-linking agent composition (B) was put into a 50 ml glass bottle, and after tightly closed, the glass bottle was put in a 70° C. oven for five days, and thereafter, the state was observed. One in which the components were uniformly mixed was evaluated as "uniform", and one in which the separation of the components or cloudiness was seen was evaluated as "non-uniform".

(VI) Curability after Aging

By using the cross-linking agent composition (B) after it was aged at 70° C. for five days, deep-part curability of the cured product was examined and evaluated similarly to the above. The measurement result thereof is shown in Table 1.

Examples 2 to 5

Comparative Examples 1 to 8

5-part silica powder (ROX200; trade name of Nippon Aerosil Co., Ltd.) (a2) surface-treated by silazane was added to 95-part α,ω-bis-dihydroxy polydimethylsiloxane (hydroxyl group content 0.05 mmol/g) (a1-1) having a 3 Pa·s viscosity, and they were kneaded in the same manner as that in the example 1, whereby base compositions (A) were prepared.

Components with the compositions shown in Table 1 and Table 2 were mixed in the same manner as that in the example 1, whereby cross-linking agent compositions (B) were prepared.

Note that, in the tables, (b2-2) represents polydimethylsiloxane whose both ends are capped with methyldimethoxy groups and whose degree of polymerization is 20, (b2-3) represents polydimethylsiloxane whose both ends are capped with methyldimethoxy groups and whose degree of polymerization is 25, (b2-4) represents polydimethylsiloxane whose both ends are capped with methyldimethoxy groups and whose degree of polymerization is 80, (b2-5) represents polydimethylsiloxane (viscosity 0.05 Pa·s) containing a 10 mol % phenyl group, (b2-6) represents linear polydimethylsiloxane with a 0.1 Pa·s viscosity, (b2-7) represents α,ω-bis-dihydroxy polydimethylsiloxane being the same as (a1), and (b2-8) represents octamethylcyclotetrasiloxane.

Next, initial states and storage stability of the obtained cross-linking agent compositions (B) were examined in the same manners as those in the example 1. Further, the base compositions (A) and the cross-linking agent compositions (B) were compounded at the ratios shown in Table 1 and Table 2, and after the resultants were cured in the same manner as that in the example 1, deep-part curability, hardness variation, and a surface state of each cured product were examined. Measurement results thereof are shown in Table 1 and Table 2.

TABLE 1

|   |   | E1 | E2 | E3 | E4 | E5 | CE1 | CE2 |
|---|---|---|---|---|---|---|---|---|
| A component | a1 hydroxyl group-terminated polydimethylsiloxane (viscosity 3 Pas) | 95 | 95 | 95 | 95 | 95 | 95 | 95 |
|  | a2 silazane-treated silica powder | 5 | 5 | 5 | 5 | 5 | 5 | 5 |
| B component | b1-1 partially hydrolyzed condensate of tetraethoxysilane (degree of polymerization 7) | 2 |  | 2 | 2 |  | 2 | 2 |
|  | b1-2 partially hydrolyzed condensate of tetraethoxysilane (degree of polymerization 10) |  | 2 |  |  | 2 |  |  |
|  | b2-1 polydimethylsiloxane containing alkoxy groups at ends (degree of polymerization 7) | 6 |  | 10 | 10 |  |  |  |
|  | b2-2 polydimethylsiloxane containing alkoxy groups at ends (degree of polymerization 15) |  | 6 |  |  |  |  |  |
|  | b2-3 polydimethylsiloxane containing alkoxy groups at ends (degree of polymerization 25) |  |  |  |  |  | 10 |  |
|  | b2-4 polydimethylsiloxane containing alkoxy groups at ends (degree of polymerization 80) |  |  |  |  |  |  |  |

TABLE 1-continued

| | | E1 | E2 | E3 | E4 | E5 | CE1 | CE2 |
|---|---|---|---|---|---|---|---|---|
| | b2-5 phenyl group-containing polysiloxane (viscosity 0.05 Pas) | | | | | | 6 | |
| | b2-6 polydimethylsiloxane (viscosity 0.1 Pas) | | | | | | | 6 |
| | b2-7 hydroxyl group-terminated polydimethylsiloxane (same as a1) | | | | | | | |
| | b2-8 octamethylcyclotetrasiloxane | | | | | | | |
| | b3-1 dibutyltin dilaurate | 0.05 | 0.05 | 0.05 | 0.05 | | 0.05 | 0.05 |
| | b3-2 aminopropyl triethoxysilane | | | | 1 | 1 | | 1 |
| | b3-3 N-(β-aminoethyl)-γ-aminopropyl trimethoxysilane | 1 | 1 | | | | 1 | |
| | b3-4 1,1,3,3-tetramethyl-2-[3-(trimethoxysilyl)propyl]guanidine | | 0.2 | | | | | |
| Compounding | ratio of A compound and B component (mass ratio) | 100:9 | 100:9 | 100:12 | 100:13 | 100:13 | 100:9 | 100:9 |
| Property | (I) initial state of B component | uniform | uniform | uniform | uniform | uniform | uniform | non-uniform |
| | (II) state of inside of cured product (deep-part curability) | rubbery | rubbery | rubbery | rubbery | rubbery | rubbery | rubbery |
| | (III) hardness variation | 3 | 2 | 3 | 3 | 3 | 8 | 9 |
| | (IV) surface state of cured product | good | good | good | good | good | defective | good |
| | (V) state of B component (after aging) | uniform | uniform | uniform | uniform | uniform | uniform | non-uniform |
| | (VI) state of inside of cured product (deep-part curability; after aging) | rubbery | rubbery | rubbery | rubbery | rubbery | rubbery | rubbery |

E1 to E5 = Example 1 to Example 5;
CE1 to CE2 = Comparative Example 1 to Comparative Example

TABLE 2

| | | CE3 | CE4 | CE5 | CE6 | CE7 | CE8 |
|---|---|---|---|---|---|---|---|
| A component | a1 hydroxyl group-terminated polydimethylsiloxane (viscosity 3 Pas) | 95 | 95 | 95 | 95 | 95 | 95 |
| | a2 silazane-treated silica powder | 5 | 5 | 5 | 5 | 5 | 5 |
| B component | b1-1 partially hydrolyzed condensate of tetraethoxysilane (degree of polymerization 7) | 2 | 2 | 2 | 2 | 2 | 2 |
| | b1-2 partially hydrolyzed condensate of tetraethoxysilane (degree of polymerization 10) | | | | | | |
| | b2-1 polydimethylsiloxane containing alkoxy groups at ends (degree of polymerization 7) | | | | | | |
| | b2-2 polydimethylsiloxane containing alkoxy groups at ends (degree of polymerization 15) | | | | | | |
| | b2-3 polydimethylsiloxane containing alkoxy groups at ends (degree of polymerization 25) | | | | | | |
| | b2-4 polydimethylsiloxane containing alkoxy groups at ends (degree of polymerization 80) | | | | 10 | | |
| | b2-5 phenyl group-containing polysiloxane (viscosity 0.05 Pas) | | | | | 10 | |
| | b2-6 polydimethylsiloxane (viscosity 0.1 Pas) | | | | | 10 | |
| | b2-7 hydroxyl group-terminated polydimethylsiloxane (same as a1) | 6 | | | | | 10 |
| | b2-8 octamethylcyclotetrasiloxane | | 6 | | 6 | | |
| | b3-1 dibutyltin dilaurate | 0.05 | 0.05 | 0.05 | 0.05 | 0.05 | 0.05 |
| | b3-2 aminopropyl triethoxysilane | 1 | 1 | | 1 | 1 | 1 |
| | b3-3 N-(β-aminoethyl)-γ-aminopropyl trimethoxysilane | | | 1 | | | |
| | b3-4 1,1,3,3-tetramethyl-2-[3-(trimethoxysilyl)propyl]guanidine | | | | | | |
| Compounding | Ratio Of A Component And B Component (Mass Ratio) | 100:9 | 100:9 | 100:13 | 100:13 | 100:20 | 100:13 |
| Property | (I) initial state of B component | gelated | uniform | non-uniform | uniform | uniform | gelated |
| | (II) state of inside of cured product (deep-part curability) | — | rubbery | rubbery | rubbery | rubbery | — |
| | (III) hardness variation | — | 5 | 7 | 8 | 9 | — |
| | (IV) surface state of cured product | — | good | good | defective | good | — |
| | (V) state of B component (after aging) | — | uniform | non-uniform | uniform | non-uniform | — |
| | (VI) state of inside of cured product (deep-part curability; after aging) | — | rubbery | rubbery | rubbery | rubbery | — |

CE3 to CE8 = Comparative Example 3 to Comparative Example 8

As is seen from these tables, the cross-linking agent compositions (B) prepared in the examples 1 to 5 are good in initial uniformity of the components and are excellent in storage stability, and no separation occurs even after the aging. Then, when such a cross-linking agent composition (B) is mixed with the base composition (A) at a preferable ratio and the resultant is left in the air, it cures at room temperature, whereby a cured product good in deep-part curability and surface state and free of hardness variation is obtained.

Next, regarding the compositions obtained in the examples 1, 2, 5 and the comparative examples 5 to 7, adhesiveness (VII) was examined in the following manner. Measurement results are shown in Table 3.

(VII) Adhesiveness

Compositions in each of which a base composition (A) and a cross-linking agent composition (B) were mixed at the mass ratio shown Table 3 were each applied on an aluminum (JIS H4000 acceptable product; 1050 P) substrate, a polyphenylene sulfide (PPS) substrate, and a polybutylene terephthalate (PBT) substrate, and after the resultants were left at 23° C. and 50% RH for seven days or more to be cured, cured products were exfoliated from the substrates, and a cohesive failure ratio was examined.

The present invention has been described in detail while referring to specific embodiments, but, it is obvious for a person skilled in the art that the invention can be variously modified and changed without departing from the scope and the spirit of the present invention.

What is claimed is:

1. A room temperature-curable polyorganosiloxane composition comprising:
(A) a base composition including: (a1) polyorganosiloxane having a hydroxyl group or an alkoxy group at a molecular end; and (a2) an inorganic filler; and
(B) a cross-linking agent composition including: (b1) an organosilicon compound having, in one molecule, three hydrolyzable groups or more combined with silicon

TABLE 3

|   |   | E1 | E2 | E5 | CE5 | CE6 | CE7 |
|---|---|---|---|---|---|---|---|
| A component | a1 hydroxyl group-terminated polydimethylsiloxane (viscosity 3 Pas) | 95 | 95 | 95 | 95 | 95 | 95 |
|   | a2 silazane-treated silica powder | 5 | 5 | 5 | 5 | 5 | 5 |
| B component | b1-1 partially hydrolyzed condensate of tetraethoxysilane (degree of polymerization 7) | 2 |   |   | 2 | 2 | 2 |
|   | b1-2 partially hydrolyzed condensate of tetraethoxysilane (degree of polymerization 10) |   | 2 | 2 |   |   |   |
|   | b2-1 polydimethylsiloxane containing alkoxy groups at ends (degree of polymerization 7) | 6 |   |   |   |   |   |
|   | b2-2 polydimethylsiloxane containing alkoxy groups at ends (degree of polymerization 15) |   | 6 |   |   |   |   |
|   | b2-3 polydimethylsiloxane containing alkoxy groups at ends (degree of polymerization 25) |   |   | 10 |   |   |   |
|   | b2-4 polydimethylsiloxane containing alkoxy groups at ends (degree of polymerization 80) |   |   |   | 10 |   |   |
|   | b2-5 phenyl group-containing polysiloxane (viscosity 0.05 Pas) |   |   |   |   | 10 |   |
|   | b2-6 polydimethylsiloxane (viscosity 0.1 Pas) |   |   |   |   |   | 10 |
|   | b2-7 hydroxyl group-terminated polydimethylsiloxane (same as a1) |   |   |   |   |   |   |
|   | b2-8 octamethylcyclotetrasiloxane |   |   |   |   |   | 6 |
|   | b3-1 dibutyltin dilaurate | 0.05 | 0.05 |   | 0.05 | 0.05 | 0.05 |
|   | b3-2 aminopropyl triethoxysilane |   |   | 1 |   | 1 | 1 |
|   | b3-3 N-(β-aminoethyl)-γ-aminopropyl trimethoxysilane | 1 | 1 |   | 1 |   |   |
|   | b3-4 1,1,3,3-tetramethyl-2-[3-(trimethoxysilyl)propyl]guanidine |   | 0.2 |   |   |   |   |
| Compounding ratio of A component and B component (mass ratio) |   | 100:9 | 100:9 | 100:13 | 100:13 | 100:13 | 100:20 |
| (VII) adhesiveness cohesive failure ratio (%) | aluminum | 100 | 100 | 100 | 100 | 90 | 100 |
|   | PPS | 90 | 100 | 90 | 80 | 20 | 30 |
|   | PBT | 90 | 100 | 70 | 70 | 0 | 0 |

E1, E2 and E5 = Example 1, Example 2 and Example 5;
CE5 to CE7 = Comparative Example 5 to Comparative Example 7

As is seen from Table 3, the compositions of the examples 1 to 2 and the example 5 in each of which the cross-linking agent composition (B) containing aminopropyl triethoxysilane (b3-2) or N-(β-aminoethyl)-γ-aminopropyl trimethoxysilane (b3-3) is blended, is possible to produce a cured product excellent in adhesiveness to substrates of metal such as Al and of resin such as PPS.

The room temperature-curable polyorganosiloxane composition of the present invention includes two components, that is, the base composition (A) and the cross-linking agent composition (B), and it is possible to adjust a compounding ratio of these components according to the use of an automatic mixer/discharger or the like. Further, since storage stability of the cross-linking agent composition (B) is good, and the cured product is excellent in various properties such as deep-part curability and curing uniformity, it is suitable as a sealing material, a potting material, a coating material, an adhesive, an in-situ molded gasket, and so on.

The room temperature-curable polyorganosiloxane composition of the present invention is usable as an elastic adhesive, a coating material, and an electrically insulating sealing material in the electric and electronic industry and the like, and is also usable as a building sealing material and the like.

atoms, or a partial hydrolysate of the organosilicon compound; (b2) polyorganosiloxane having an alkoxy group at a molecular end and represented by a general formula:

[Chemical Formula 1]

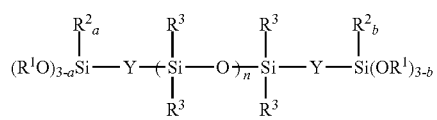

where $R^1$'s represent alkyl groups or alkoxyalkyl groups that are identical or different, and $R^2$'s and $R^3$'s both represent unsubstituted or halogen- or cyano group-substituted univalent hydrocarbon groups that are identical or different, Y represents an oxygen atom or an unsubstituted bivalent hydrocarbon group, a is 0 or 1, b is 0 or 1, and n is an integer of 1 to 30; and (b3) a curing catalyst including an organic compound containing a nitrogen atom,
wherein the base composition (A) contains the inorganic filler (a2) at a ratio of 1 to 500 parts by mass to 100 parts by mass of the component (a1), and the cross-linking agent composition (B) is compounded so that, to 100 parts by mass of the component (a1), the component (b2) is 0.5 to 20 parts by mass and the curing catalyst (b3) is 0.01 to 10 parts by mass, and the number of the alkoxy groups of the component (b1) per one piece of the hydroxyl group or the alkoxy group of the component (a1) is 2 to 20.

2. The room temperature-curable polyorganosiloxane composition according to claim 1,
wherein the component (a1) is polyorganosiloxane having the hydroxyl group at the molecular end.

3. The room temperature-curable polyorganosiloxane composition according to claim 1,
wherein (b3) the curing catalyst is an amino group-containing alkoxysilane represented by a general formula: $(R^4O)_3Si\text{---}R^5\text{---}NH\text{---}R^6$ where $R^4$'s represent alkyl groups or alkoxyalkyl groups that are identical or different, $R^5$ represents an unsubstituted bivalent hydrocarbon group, and $R^6$ represents a hydrogen atom, or an unsubstituted or halogen- or cyano group-substituted univalent hydrocarbon group, or an aminoalkyl group.

4. The room temperature-curable polyorganosiloxane composition according to claim 1,
wherein the base composition (A) and the cross-linking agent composition (B) are compounded at a mass ratio of 100:3 to 100:20.

5. The room temperature-curable polyorganosiloxane composition according to claim 1,
wherein (b3) the curing catalyst includes at least one selected from diethylhydroxylamine, dimethylhydroxylamine, and guanidine derivatives.

6. The room temperature-curable polyorganosiloxane composition according to claim 5,
wherein (b3) the curing catalyst includes organotin compound and the guanidine derivative.

* * * * *